United States Patent Office 3,179,511
Patented Apr. 20, 1965

3,179,511
METHOD FOR STABILIZING SOIL
STERILIZING COMPOSITION
Reed A. Gray, Saratoga, Calif., and Howard G. Streim, Monsey, N.Y., assignors to Stauffer Chemical Company, New York, N.Y., a corporation of Delaware
No Drawing. Filed Dec. 21, 1961, Ser. No. 161,309
3 Claims. (Cl. 71—2.7)

This invention pertains to compositions for use in the sterilization of soil and, in particular, to compositions having as their active component a salt of a lower N-alkyldithiocarbamic acid stabilized with a minor quantity of a trithiocarbonate salt. The invention is also concerned with the preparation and use of the aforenamed compositions.

In the agricultural arts, it is a common practice shortly before planting to sterilize the soil by treating it with certain toxic materials. The purpose of treating the soil in this manner is to rid it of various indwelling pest organisms such as weeds, insects, fungi and the like which attack or otherwise interfere with the growth of valuable commercial crops. Manifestly, it is essential that the toxicants exert short lived albeit intense biocidal activity since their retention in the soil can be injurious to the subsequently planted crops.

Materials which have proved to be eminently suitable for the aforesaid purpose are the salts of N-alkyldithiocarbamic acid of the type represented by the formula:

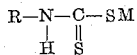

wherein R is a lower alkyl radical from 1 to 2 carbon atoms and M is a positive salt-forming group, i.e. an alkali metal, an alkaline earth metal or an ammonium radical. These compounds and their use for the sterilization of soil are described in U.S. Patent 2,766,554.

Because of their widespread use in large scale farming operations, N-alkyldithiocarbamic acid salts are manufactured in large quantities. A particularly valuable and useful representative of this class of compounds is sodium N-methyldithiocarbamate. Although the purified material is a solid, it is normally not supplied in this form but is sold as a 20–40% aqueous solution. It is diluted to the desired concentration shortly before use.

The efficacy of sodium N-methyldithiocarbamate is due to its rapid decomposition in the soil with concomitant release of large quantities of methylisothiocyanate. As the highly toxic methylisothiocyanate diffuses through the soil, the harmful pest organisms dwelling therein are rapidly and efficiently exterminated. Because of its relatively high vapor pressure, the methylisothiocyanate disappears from the soil in a few days leaving it in an essentially sterile condition and free of any residual harmful chemicals. For further details on the utilization of sodium N-alkyldithiocarbamate in the sterilization of soil, reference is made to the aforementioned U.S. patent.

Although the sterilization of soil by means of N-alkyldithiocarbamate salts has greatly benefited commercial agriculture, it has recently been discovered that aqueous solutions of these compounds exhibit a tendency to undergo a slow decomposition if stored or otherwise allowed to stand prior to use. It has moreover been ascertained that the decomposition is accompanied by the formation of a phytotoxic by-product. Unlike the N-alkyldithiocarbamate salts, the phytotoxic substance is not rapidly dissipated but remains in the soil and this may be detrimental to certain subsequently planted crops. With a view to ascertaining the origin of the phytotoxic impurity as well as its chemical composition, we carried out extensive tests and analyses of aqueous solutions of N-alkyldithiocarbamate salts. In particular, we worked with the commercially available sodium N-methyldithiocarbamate which is produced by the reaction of carbon disulfide and methyl amine in sodium hydroxide solution. This product normally is contaminated with methyl amine.

In carrying out our analyses, samples of aqueous sodium N-methyldithiocarbamate were allowed to stand several days at room temperature after which the decomposition products were isolated and then submitted to chemical and infra-red analysis. It was established that the decomposition of sodium N-methyldithiocarbamate in aqueous media yielded primarily sulfur, sodium carbonate, sodium thiosulfate and sym. dimethylthiourea. The latter component was shown to be responsible for the phytotoxicity of aged solutions of sodium N-methyldithiocarbamate salts. The above determined data and information was then analyzed with a view to arresting or otherwise eliminating the deleterious decomposition of the sodium N-methyldithiocarbamate solutions.

It has now been discovered that the stabilization of aqueous solutions of sodium N-alkyldithiocarbamate salt can be achieved by treating them with a trithiocarbonate salt and the provision of such stabilized solutions constitutes a primary object and purpose of this invention. Other objects and purposes will become manifest as the description proceeds.

In accordance with the invention, excellent stabilization of aqueous N-alkyldithiocarbamate can be realized by adding to such solutions a minor quantity of a soluble trithiocarbonate salt. When stabilized in the above described manner, aqueous solutions of sodium N-methyldithiocarbamate were allowed to age and then assayed for sym. dimethylthiourea. Comparison with unstabilized controls demonstrated that the trithiocarbonate salt greatly depressed the formation of the deleterious phytotoxic impurity. The quantity of trithiocarbonate salt is not critical but since a minor amount suffices to effect stabilization of large quantities of the N-alkyldithiocarbamic acid salts, it is recommended in the interests of economy that only a few percent of the stabilizer be utilized. For most purposes, a concentration varying from about 0.1 to 2.5% of sodium trithiocarbonate by weight of the 40% N-alkyldithiocarbamate salt solution gave excellent stabilization.

As examples of trithiocarbonate salts of the type which can be used in practicing the invention, mention is made of alkali metal trithiocarbonates, i.e. lithium trithiocarbonate, sodium trithiocarbonate, potassium trithiocarbonate etc., alkaline earth metal trithiocarbonates, i.e. calcium trithiocarbonate, barium trithiocarbonate etc. and ammonium salts of trithiocarbonic acid. Because it is relatively inexpensive and readily available, sodium trithiocarbonate is preferred as the source of a trithiocarbonate salt.

A typical commercial soil sterilant composition based on N-alkyldithiocarbamates is sold as an aqueous solution of 20–40% sodium N-methyldithiocarbamate. In accordance with the method described herein, we have achieved excellent stabilization of this product by adding thereto 0.1–2.5% of sodium trithiocarbonate based on the weight of the 40% sodium N-methyldithiocarbamate solution.

We have not, as yet, ascertained the exact mechanism which acounts for the stabilization of sodium N-methyldithiocarbamate solutions by means of trithiocarbonate salts. It is, however, believed that the decomposition of N-methyldithiocarbamate salts in aqueous media releases small amounts of methylisothiocyanate which reacts with the excess methyl amine normally present in such solutions with concomitant formation of N,N'-dimethylthiourea. However, in the stabilized solutions containing sodium trithiocarbonate, the methylisothiocyanate preferentially reacts with the stabilizer to produce more N-methyldithiocarbamic acid. The following equations formalistically depict the aforedescribed reactions:

(I) 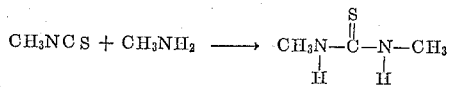

(II) 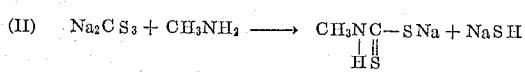

It is to be particularly pointed out that aqueous solutions of N-methyldithiocarbamate salts when stabilized in accordance with the method of the invention, showed no diminution of their sterilizing or killing action. For instance, soil fumigation tests were conducted with 2 portions of sodium N-methyldithiocarbamate solutions, one of which contained 1% by weight sodium trithiocarbonate. Evaluation of the subsequent test data revealed no detectable difference in the biocidal activity of the test solutions.

Whereas we examined numerous types of sulfur-containing salts, the trithiocarbonates were found to be far superior as stabilizers of aqueous solutions of N-methyldithiocarbamates. A possible exception was noted in the case of sodium hydrosulfide which exhibited a slight retarding effect on the break-down of aqueous sodium N-dithiocarbamate.

The efficiency of sodium trithiocarbonate in supressing the formation of the 1,3-sym. dimethylthioura in aqueous solutions of sodium N-methyldithiocarbamate is vividly shown in the following test. Three samples of aqueous N-methyl dithiocarbamate solution were prepared, one of which contained 1% sodium trithiocarbamate and the other 0.4%. The third solution contained no sodium trithiocarbonate and served as the control. The aforesaid solutions were allowed to stand and examined from time to time. After an interval of 25 days, the control with no stabilizer contained 15 mg./ml. of phytotoxic 1,3-sym. dimethylthiourea whereas the solution stabilized with 0.4% sodium trithiocarbonate contained only 6 mg./ml. and the solution stabilized with 1.0% sodium trithiocarbonate contained about 3 mg./ml. Manifestly, the aforedescribed test attests to the efficiency of sodium trithiocarbonate in suppressing the formation of the phytotoxic thiourea.

The stabilized solutions of the present invention may be applied to the soil by a variety of procedures known to the art and, in general, the method of application can be patterned after the manner by which N-alkyldithiocarbamic salts are utilized for the sterilization of soil. Generally the toxicants should be applied at rates varying from about 50–800 lbs. active ingredient per acre. Under most normal conditions, applications at the rate of about 100 lbs. per acre will be found satisfactory, since the compounds as have already been noted, have considerable fumigating action and are able to thus travel through the soil. It is ordinarily sufficient to apply the compound in an aqueous carrier to the surface of the soil. Those having skill in the agricultural arts will be cognizant of various methods and techniques for treating soil with the compounds of the invention.

We claim:

1. The method of preventing the formation of 1,3-dimethylthiourea in an aqueous soil sterilizing composition containing 20–40% by weight of an N-alkyldithiocarbamate of the formula

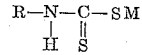

wherein R represents lower alkyl and M is selected from the class consisting of an alkali metal, an alkaline earth metal and amomnium, which comprises adding to said solution 0.1% to 2.5% based on the aqueous solution of a salt of trithiocarbonic acid, said salt being selected from the class consisting of an alkali metal salt, an alkaline earth metal salt and an ammonium salt.

2. The method according to claim 1 wherein the N-dithiocarbamate is sodium N-methyldithiocarbamate.

3. The method according to claim 1 wherein the formation of 1,3-dimethylthiourea is prevented by adding to the 20–40% by weight N-alkyldithocarbamate solution, 0.1 to 2.5% of sodium trithiocarbonate.

References Cited by the Examiner
UNITED STATES PATENTS

| | | | |
|---|---|---|---|
| 2,498,936 | 2/50 | Badertscher et al. | 260—455 |
| 2,600,861 | 6/52 | Englund | 71—2.7 |
| 2,791,605 | 5/57 | Doorman et al. | 71—2.7 X |
| 2,797,181 | 6/57 | Drexel | 167—22 |

LEWIS GOTTS, *Primary Examiner.*

M. A. BRINDISI, JULIAN S. LEVITT, *Examiners.*